T. Carr.
Mixing Apparatus.
No. 93,595. Patented Aug. 10, 1869.

Witnesses
Wm A Steel
John Parker

Inventor;
T. Carr
By his atty
H Howson

UNITED STATES PATENT OFFICE

THOMAS CARR, OF BRISTOL, GREAT BRITAIN.

IMPROVED MACHINE FOR DISINTEGRATING, DISPERSING, AND MIXING FERTILIZERS AND OTHER MATERIALS.

Specification forming part of Letters Patent No. 93,595, dated August 10, 1869; patented in England, October 22, 1868.

*To all whom it may concern:*

Be it known that I, THOMAS CARR, of the city of Bristol, in the United Kingdom of Great Britain and Ireland, engineer, have invented new and useful Improvements in Machinery for Disintegrating, Dispersing, or Mixing Various Substances and Articles of Manufacture; and I do hereby declare the following to be a full, clear, and exact description of the same, reference being had to the accompanying drawings, and to the letters of reference marked thereon.

My improvements are made upon that machinery for disintegrating artificial manures and other substances, for which Letters Patent were granted to me for the United Kingdom of Great Britain and Ireland, known as "Carr Disintegrator;" and the improvements to be hereinafter described are part of those for which Letters Patent have been granted to me for the United Kingdom of Great Britain and Ireland, numbered 3,235, and dated the 22d day of October, A. D. 1868.

In the ordinary disintegrator invented by me one set of cages is mounted upon a solid shaft, the two ends of which have bearings in plumber-blocks, and the other set of cages is mounted upon a hollow shaft which fits and rotates upon the solid shaft, and as the two shafts are driven at considerable speed in opposite directions, the friction upon the hollow shaft is double that due to its own speed; and besides this objection the bushes forming the bearing of the hollow shaft wear away rapidly, owing to the difficulty of keeping the lubricating matter within the shaft, and the result is excessive vibration in the cages, besides other minor defects; and my invention relates to one of the methods described in the specification of my aforesaid British patent for obviating these difficulties.

My invention consists in mounting each of the two sets of cages upon the end of a shaft, and in placing these ends of the two shafts, upon which the cages are secured, close together, or nearly so, and with the axes of the shafts in the same line, and each shaft in pedestals or plumber-blocks.

The driving-pulleys may be placed on the shafts between the two bearings, or upon the ends of the shaft overhanging the outside bearing.

Figure 1:
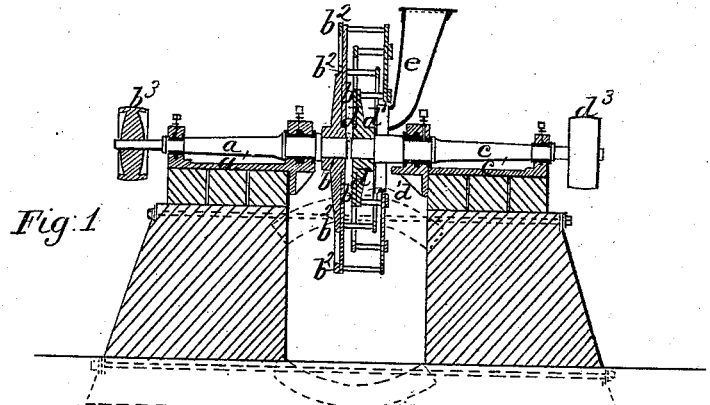
Figure 2:
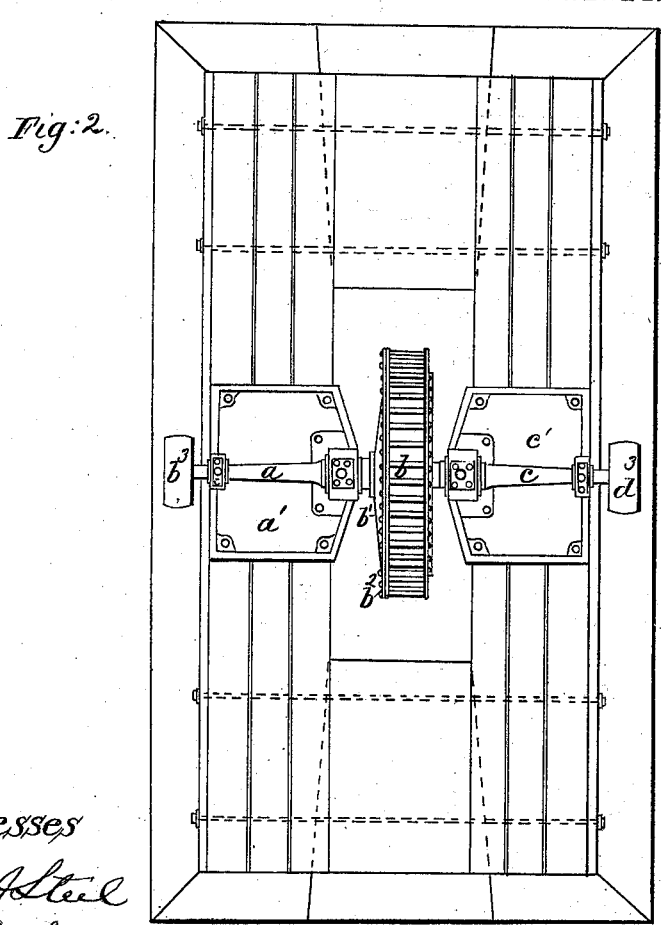

Figure 1 is a section of my improved machine, taken lengthwise of the shafts. Only two bars of each cage are shown. This figure also shows a cross-section of the bed or foundation. Fig. 2 is a plan view of the machine and the bed or foundation.

The construction of the cages, the mode of feeding the machine, and the formation of the bed or foundation form no part of the present invention; but as the manner of constructing the cages of large machines, to be driven at great speed, of feeding the same, and of forming the bed or foundation is not well known, I shall give some information thereon in describing the drawings.

A is the shaft, upon the end of which the large disk $b$ is fixed, which disk, for large machines, may be formed by a cast-iron center disk part, $b'$, keyed to the shaft, having a wrought-iron disk, $b$, riveted to the center part $b'$, and to the wrought-iron disk rings $b^2$ are applied to give increased strength where the holes are formed for the bars which pass through both the disk $b$ and rings $b^2$.

$c$ is the shaft for the inner disk, $d$, which is also formed by a cast-iron center disk, $d'$, and a wrought-iron disk, $d$.

The disk and rings should be turned up true, and the cages balanced for high speeds.

The driving-pulleys $b^3$ and $d^3$ are placed upon the outside ends of the shafts, which are driven in contrary directions.

The pedestals for the shafts are formed in cast-iron bed-plates $a'$ and $c'$, bolted down upon wood supported by masonry, as shown, the bolts from the beams and from the bed-plates passing through the whole depth of the masonry.

The material to be operated upon may be fed by means of a hopper or spout, $e$, as shown in Fig. 2.

What I claim as my invention, and desire to secure by Letters Patent, is—

The mounting of each of the two sets of cages upon the end of a separate shaft, the two shafts being placed end to end and in pedestals or plumber-blocks, substantially as hereinbefore described, and illustrated by the drawings.

In testimony whereof I have signed my name to this specification in the presence of two subscribing witnesses.

THOMAS CARR.

Witnesses:
WILLIAM M. KEMP,
WILLIAM THOMPSON.